United States Patent [19]

Ten Kate

[11] Patent Number: 5,960,037
[45] Date of Patent: Sep. 28, 1999

[54] ENCODING OF A PLURALITY OF INFORMATION SIGNALS

[75] Inventor: Warner R.T. Ten Kate, Eindhoven, Netherlands

[73] Assignee: U.S. Phillips Corporation, New York, N.Y.

[21] Appl. No.: 08/826,916

[22] Filed: Apr. 9, 1997

[30] Foreign Application Priority Data

Apr. 10, 1996 [EP] European Pat. Off. ............. 96200937

[51] Int. Cl.⁶ ............................. H04B 1/66; H04B 14/04; H04H 5/00

[52] U.S. Cl. ......................... 375/240; 375/243; 375/254; 375/296; 381/13; 381/73.1; 381/94.1; 704/500; 704/227; 704/229

[58] Field of Search ................................... 375/240, 242, 375/241, 243, 254, 285, 296; 704/500, 229, 230, 227; 381/2, 13, 94.1, 73.1, 1

[56] References Cited

U.S. PATENT DOCUMENTS

| | | | |
|---|---|---|---|
| 4,620,311 | 10/1986 | Immink | 375/19 |
| 5,481,643 | 1/1996 | Ten Kate et al. | 395/2.36 |
| 5,544,247 | 8/1996 | Ten Kate | 381/27 |
| 5,625,745 | 4/1997 | Dorward et al. | 704/229 |
| 5,627,937 | 5/1997 | Kim | 375/240 |
| 5,703,999 | 12/1997 | Herre et al. | 704/500 |
| 5,734,657 | 3/1998 | Kim | 704/229 |

FOREIGN PATENT DOCUMENTS

| | | | |
|---|---|---|---|
| 0400755A1 | 12/1990 | European Pat. Off. | H04B 1/66 |
| 0402973A1 | 12/1990 | European Pat. Off. | G11B 20/10 |
| 0457390A1 | 11/1991 | European Pat. Off. | H04B 1/66 |
| 0457391A1 | 11/1991 | European Pat. Off. | H04B 1/66 |
| 0497413A1 | 8/1992 | European Pat. Off. | H04B 1/66 |

OTHER PUBLICATIONS

"A New Surround–Stereo–Surround Coding Technique" W. Ten Kate et al, J. Audio Eng. Soc. vol. 40, No. 5, May 1992, pp. 376–382.

"Matrixing of Bit Rate Reduced Audio Signals" W.R. Th. Ten Kate, P.M. Boers, A. Makivirta, J. Kuusama, K.E. Christensen, E. Sorensen, Proc. of the ICASSP, 1992, Mar. 23–26, San Francisco, pp. II–205—11–208.

ISO/IEC International Standard is 13818–3, Information Technology–Coding of Moving Pictures and Associated Audio, Part 3: Audio, May 10, 1994.

ISO/IEC International Standard is 11172–3, Information Technology–Coding of Moving Pictures and Associated Audio for Digital Storage Media at Up to About 1.5 MBITS/Pare 3: Audio, 1993.

*Primary Examiner*—Stephen Chin
*Assistant Examiner*—Betsy L. Deppe
*Attorney, Agent, or Firm*—Michael E. Belk

[57] ABSTRACT

The apparatus for encoding a plurality of digital information signals, having at least a first input unit for receiving a first digital information signal and a second input unit for receiving a second digital information signal. A signal combination unit combines the first and second digital information signal to generate a first combination signal. First and second data compression units compress the first and second digital information signal so as to obtain first and second data reduced digital information signals. First, second, and third masked threshold determining units determine first, second and third masked thresholds respectively from the first, second digital information signals and the combination signal respectively. A selection unit selects one masked threshold from the first and third masked threshold so as to obtain a first selected masked threshold. Preferably, the first selected masked threshold is the smallest of the first and third masked thresholds. The first data compression unit compresses the first digital information signal in response to the first selected masked threshold. A formatting unit combines the first and second data reduced digital information signals into a transmission signal for transmission via a transmission medium. The choice is made between at least two masked thresholds, including the masked threshold derived from the information signal itself and the masked threshold derived from another signal. The other signal may be a combination signal that includes the information signal.

24 Claims, 8 Drawing Sheets

5,960,037

ENCODING OF A PLURALITY OF INFORMATION SIGNALS

FIELD OF THE INVENTION

The invention relates to the field of transmission of multi-channel matrixed audio information signals.

BACKGROUND OF THE INVENTION

Various prior art transmission systems have been described in which a multi channel information signal, such as a multi channel audio signal, is transmitted via a transmission medium. Generally, use is made of matrixing in order to obtain first and second composite audio signals that can be retrieved upon reception and reproduced as a stereo audio signal. Reference is made in this respect to EP 678,226 A1, which is document (8) in the list of related documents.

The present invention, however, is not restricted to a transmission of multi channel information signals in matrixed form.

Upon encoding, the various information signals of the multi channel information signal are data compressed and combined into one serial datastream and subsequently transmitted via the transmission medium. Upon reception of the transmitted data, the various data compressed information signals are retrieved and data expanded so as to obtain replicas of the original information signals.

Compression means for bit rate reducing a signal has been described in published European patent applications 457, 390A1 (PHN 13.328) and 457,391A1 (PHN 13.329), the documents (7a) and (7b) respectively in the list of references. Further, reference is made to two ISO/IEC standard documents, the documents (9) and (10) in the list of related documents, referred to as MPEG-1 and MPEG-2 standard documents.

The documents cited above generally relate to data compression based on subband coding. The invention is however not restricted to data compression based on subband coding. Other data compression techniques, such as transform coding, are equally well applicable.

Those skilled in the art are directed to the following citations: J.A.E.S., Vol. 40, No. 5, May 1992, pp. 376–382; "Matrixing of bitrate reduced audio signals" by W. R. Th. ten Kate et al, in Proc. of the ICASSP, Mar. 23–26, 1992, San Francisco, Vol. 2, pp. II-205 to II-208; U.S. patent application Ser. No. 08/427,646 (PHQ 93-002); European Patent Application no. 402,973 (PHN 13.241); European patent application no. 497,413A1 (PHN 13.581); U.S. Pat. No. 4,620,311 (PHN 11.117); European Patent Application no. 400.755 (PHQ 89.018A); ISO/IEC international standard IS 11172-3, Information technology—coding of moving pictures and associated audio for digital storage media up to about 1.5 Mbit/s, Part 3: audio; and ISO/IEC international standard IS 13818-3, Information technology—coding of moving pictures and associated audio, Part 3: audio.

The above citations are hereby incorporated in whole by reference.

SUMMARY OF THE INVENTION

The invention aims at providing further improvements to an encoder apparatus for encoding a plurality of information signals.

In accordance with the invention, the apparatus for encoding a plurality of digital information signals, having at least first input means for receiving a first digital information signal, second input means for receiving a second digital information signal, first signal combination means for combining at least the first and second digital information signal and being adapted to generate a first combination signal, first and second data compression means for data compressing the first and second digital information signal so as to obtain first and second data reduced digital information signals, first, second and third masked threshold determining means for determining first, second and third masked thresholds respectively from the first, second digital information signals and the first combination signal respectively, first selection means for deriving one masked threshold from at least the first and third masked threshold so as to obtain a first selected masked threshold, the first data compression means being adapted to carry out a data compression step on the first digital information signal in response to said first selected masked threshold, formatting means for combining the first and second data reduced digital information signals into a transmission signal suitable for transmission via a transmission medium.

The invention is based on the following recognition. The invention resides in the objective to provide a multi channel encoding apparatus which enables an undistorted decoding in a corresponding decoding apparatus. The encoder apparatus encodes the multi channel signals and the encoded multi channel signals will be received in the decoder apparatus. This decoder apparatus may generally be capable of carrying out a matrixing procedure so as to obtain at least one combination signal. In a 2-channel decoding apparatus, matrixing results in the generation of two combination signals that can be reproduced as a stereo signal via two loudspeakers positioned in a stereo setup. Experiments revealed that during decoding sometimes an noise component became audible. Investigations resulted in the recognition that those noise components became apparent because of the matrixing process. More specifically, the noise components originated from quantisation noise that was masked before the matrixing step could not be masked thereafter. By selecting another masked threshold, this problem could be solved. More specifically, during encoding an information signal, a choice is made for the masked threshold with which the information signal in question must be data reduced. The choice is made between at least two masked thresholds, one of which is the masked threshold derived from the information signal itself and one of which is the masked threshold derived from another signal, such as that combination signal that includes the information signal in question.

The problems identified above occur in various transmission systems, such as in transmitting a stereo audio signal. The left hand signal component (L) and the right hand signal component (R) of the stereo audio signal are data compressed and subsequently transmitted. Upon reception, the data compressed left and right hand signal components are data expanded and combined so as to obtain a mono signal. Quantisation noise may become audible in the mono signal without applying the measure in accordance with the invention.

In a 3-channel encoding apparatus, a left hand signal component (L), a right hand signal component (R) and a centre signal component (C) of the 3-channel audio signal are data compressed and subsequently transmitted. Upon reception, the data compressed left and right hand signal components and the centre signal component are data expanded. The left hand signal component and the centre signal component are subsequently combined so as to obtain a composite left signal component and the right hand signal component and the centre signal component and combined so as to obtain a composite right hand signal component. Quantisation noise may become audible in both composite signal components without applying the measure in accordance with the invention.

In a 4-channel encoding apparatus, a left hand signal component (L), a right hand signal component (R), a centre signal component (C) and a surround signal component (S) of the 4-channel audio signal are data compressed and subsequently transmitted. Upon reception, the data compressed left and right hand signal components, the centre signal component and the surround signal component are data expanded. The left hand signal component, the centre signal component and the surround signal component are subsequently combined so as to obtain a composite left signal component and the right hand signal component, the centre signal component and the surround signal component are combined so as to obtain a composite right hand signal component. Quantisation noise may become audible in both composite signal components without applying the measure in accordance with the invention.

In a 5-channel encoding apparatus, a left hand signal component (L), a right hand signal component (R), a centre signal component (C), a surround left signal component ($S_l$) and a surround right signal component ($S_r$) of the 5-channel audio signal are data compressed and subsequently transmitted. Upon reception, the data compressed left and right hand signal components, the centre signal component and the surround left and right signal components are data expanded. The left hand signal component, the centre signal component and the surround left signal component are subsequently combined so as to obtain a composite left signal component and the right hand signal component, the centre signal component and the surround right signal component are combined so as to obtain a composite right hand signal component. Quantisation noise may become audible in both composite signal components without applying the measure in accordance with the invention.

Those skilled in the art will understand the invention and additional objects and advantages of the invention by studying the description of preferred embodiments below with reference to the following drawings which illustrate the features of the appended claims:

BRIEF DESCRIPTION OF THE INVENTION

FIG. 1 shows part of a first embodiment of the encoder apparatus for encoding a first and a second digital information signal, FIG. 2 shows another part of the encoder apparatus of FIG. 1, and a corresponding decoder apparatus for decoding the first and second data reduced digital information signals, FIG. 3 shows part of a second embodiment of the encoder apparatus in accordance with the invention, for encoding a first, second and a third digital information signal, FIG. 4 shows another part of the embodiment of FIG. 3, and a corresponding decoder apparatus, FIG. 5 shows part of a third embodiment of the encoder apparatus, for encoding four digital information signals, FIG. 6 shows another part of the encoder apparatus of FIG. 5, and a corresponding decoder apparatus, FIG. 7 shows part of a fourth embodiment of the encoder apparatus, for encoding five digital information signals, FIG. 8 shows another part of the encoder apparatus of FIG. 7, and a corresponding decoder apparatus, and FIG. 9 shows the encoder apparatus included in a recording arrangement.

DETAILED DESCRIPTION OF THE PREFERRED EMBODIMENTS

Figure 1:
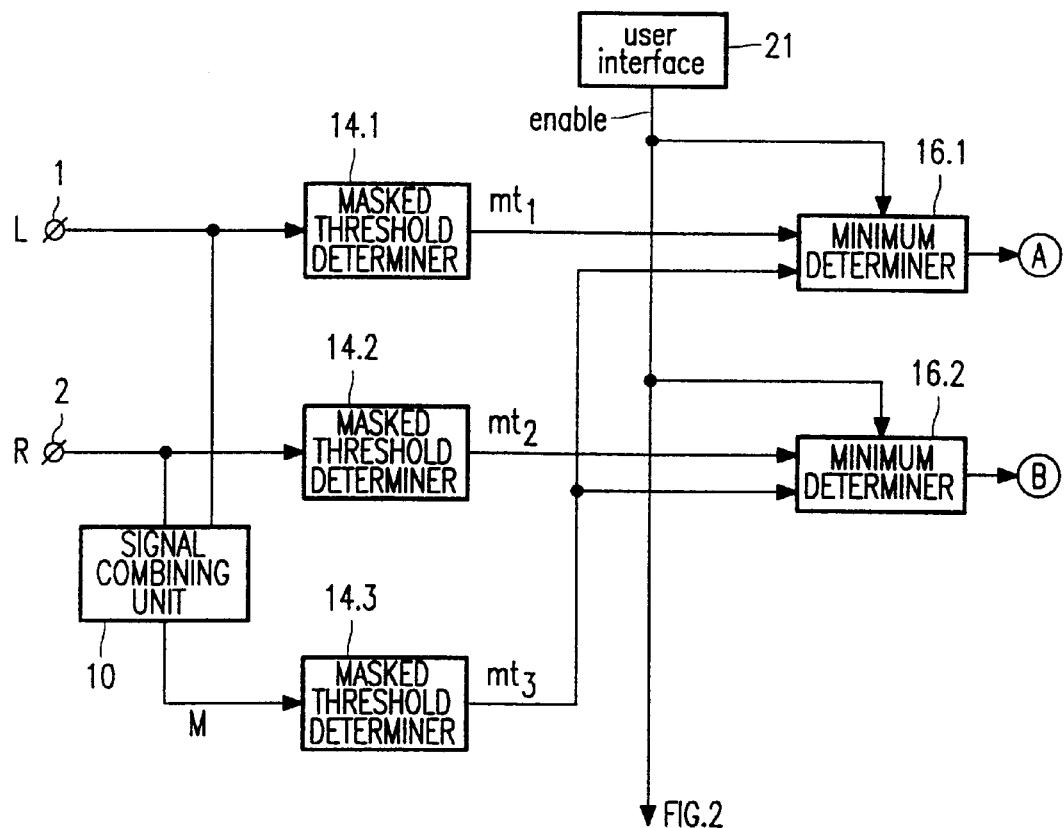
Figure 2:
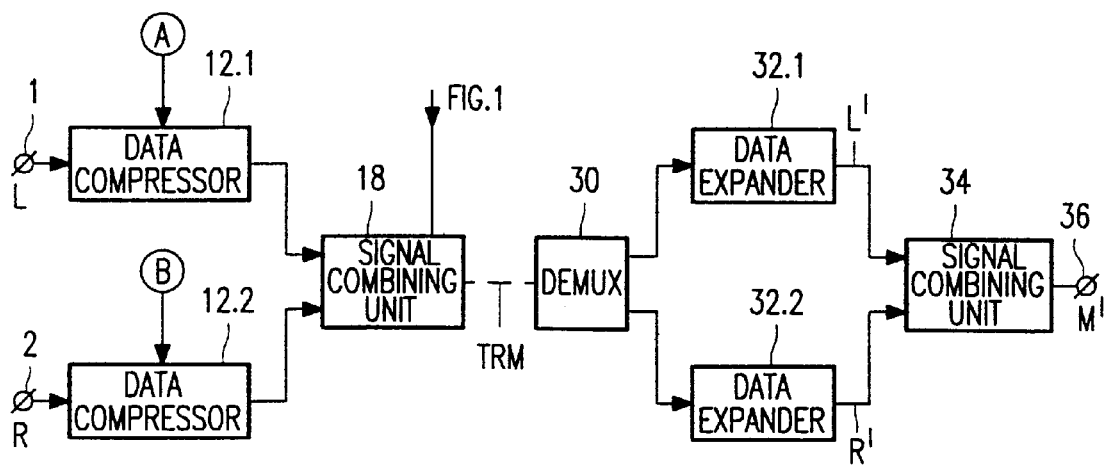

FIG. 1 shows a portion of a first embodiment of the encoder apparatus and FIG. 2 shows another portion of the encoder apparatus of FIG. 1. The encoder has a first input terminal 1 for receiving a first digital information signal, such as the left signal component L of a stereo audio signal, and a second input terminal 2 for receiving a second digital information signal, such as the right signal component R of the stereo audio signal. The input terminal 1 is coupled to inputs of a first data compressor unit 12.1 and a first masked threshold determining unit 14.1 and to an input of a signal combination unit 10. The input terminal 2 is coupled to inputs of a second data compressor unit 12.2 and a second masked threshold determining unit 14.2 and to another input of the signal combining unit 10. An output of the signal combining unit 10 is coupled to a third masked threshold determining unit 14.3.

Outputs of the data compressor units 12.1 and 12.2 are coupled to corresponding inputs of a signal combining unit 18. The encoder apparatus is further provided with selection units 16.1 and 16.2. The selection unit 16.1 has inputs coupled to the outputs of the masked threshold determining units 14.1 and 14.3 and the selection unit 16.2 has inputs coupled to the outputs of the masked threshold determining units 14.2 and 14.3.

The encoder apparatus functions as follows. In the present embodiment, the signal combination unit 10 combines the signals L and R by adding them in order to obtain a combination signal M, that is:

$$M=L+R. \qquad (Eq.1)$$

The masked threshold determining units 14.1, 14.2 and 14.3 generate a masked threshold $mt_1$, $mt_2$ and $mt_3$ respectively, from the signals L, R and M, applied to their respective inputs. The masked thresholds are required to enable a data compression step to be carried out on the two information signals in the data compression units 12.1 and 12.2. The generation of a masked threshold from an information signal is well known in the art and needs no further explanation. For a further description, reference is made to various prior art documents.

One data compression technique for realizing a data compression on the two information signals is the subband coding data compression technique, as applied in MPEG-1 and MPEG-2 and DAB. In this data compression technique, signal components in the information signal lying below a masked threshold are left out.

In accordance with the prior art, the masked threshold derived from the first digital information signal L, that is the masked threshold $mt_1$ derived in the masked threshold determining unit 14.1, is used for data compressing this first digital information signal L, and the masked threshold derived from the second digital information signal R, that is the masked threshold $mt_2$ derived in the masked threshold determining unit 14.2, is used for data compressing this second digital information signal. In accordance with the present invention, however, a selection is made between two masked thresholds for each of the two information signals L and R, for the reason explained hereafter.

FIG. 2 shows not only a portion of the encoder apparatus, but also a corresponding decoder apparatus. The decoder apparatus comprises a demultiplexer unit 30 for receiving the transmission signal transmitted via the transmission medium TRM. The demultiplexer unit 30 retrieves the data compressed first and second digital signals from the transmission signal and supplies the data compressed digital signals to respective data expander units 32.1 and 32.2. In the data expander units 32.1 and 32.2, the data compressed digital information signals are expanded so as to obtain replicas L' and R' respectively, of the original digital information signals L and R. The decoder apparatus further comprises a signal combination unit 34 for combining the replicas L' and R' so as to obtain a combination signal M', output from terminal 36, in accordance with $$M'=L'+R'. \tag{Eq.2}$$

Let us assume for the moment that the signals L and R have been data compressed on the basis of $mt_1$ and $mt_2$ respectively. Actually, however, the following relationship exists:

$$M'=L+N_L+R+N_R, \tag{Eq.3}$$

where $N_L$ is the quantisation noise introduced by data compressing the signal L using the masked threshold $mt_1$ and $N_R$ is the quantisation noise introduced by data compressing the signal R using the masked threshold $mt_2$. Generally, the noise component $N_L$ is masked by the signal L and the noise component $N_R$ is masked by the signal R, so that the quantisation noise is unaudible. Suppose however that R and L are roughly of the same amplitude, but of opposite phase. As a result of this, the signal component L+R is small. As $N_L$ and $N_R$ are uncorrelated to each other, they add up, and the noise components $N_L+N_R$ will become audible.

In order to overcome this, the selection units 16.1 and 16.2 are provided. The selection unit 16.1 determines which of the masked thresholds $mt_1$ and $mt_3$ supplied to its inputs is the smallest and supplies the smallest masked threshold to the data compression unit 12.1. In the same way, the selection unit 16.2 determines which of the masked thresholds $mt_2$ and $mt_3$ supplied to its inputs is the smallest and supplies the smallest masked threshold to the data compression unit 12.2.

By supplying the smallest of the masked thresholds $mt_1$ and $mt_3$ to a data compressor unit 12.1, it is guaranteed that upon reception and decoding both replicas L' and M' will maintain their audio quality as their original ones. With respect to the replica L', this is obvious as, if the masked threshold $mt_1$ is used, this is the masked threshold of L, so that it masks the quantization noise in L'. When the masked threshold $mt_3$ had been chosen, because this masked threshold was lower than $mt_1$, this masked threshold will also mask the quantization noise in L'. More specifically, an extra margin is introduced between the level of audibility and the actual noise level of L'.

With respect to the replica M', the following reasoning applies. Suppose that the masked threshold $mt_3$ of the signal M is lower than the other two masked thresholds, $mt_1$ and $mt_2$. That means that L and R are compressed under the influence of the masked threshold $mt_3$ and the quantization noise in M' is masked by the masked threshold $mt_3$. Suppose now that either $mt_1$, or $mt_2$ or both were lower than $mt_3$. This again results in an extra margin between audibility and the actual noise level in the signal M' so that noise components remain inaudible.

With respect to the replica R', the same reasoning applies as given above for the replica L'.

A better look at eq. (3) shows that, dependinig on the actual used masked thresholds and the actual applied compression, a noise component can result which is twice the level of the given masked threshold induced by M. This situation occurs if the levels of both $N_L$ and $N_R$ reach the level of masked threshold induced by M. In fact, if $N_L$ and $N_R$ are also fully correlated, the total level may be four times the allowed masked threshold induced by M. Usually, $N_L$ and $N_R$ will be uncorrelated and thus a realistic worst case overshoot of 10.log2, which is roughly 3 dB, may occur.

To circumvent this problem, the two selection units check each others selection results. If both selection units select $mt_3$ as the selected masked threshold, they may be capable of both applying an extra decrease of a predetermined number of dB to the masked threshold $mt_3$ and supply the masked threshold thus obtained as the selected masked threshold to their outputs. This predetermined number could be chosen to be value lying in the range from 0 dB to 3 dB.

It should be remarked that the spread in accuracy in measuring human hearing capabilities is generally larger than the 3 dB mentioned above. As a consequence, this above introduced decrease of the masked threshold might be omitted in practical realisations. Alternatively, the decrease can be applied as a kind of safety margin.

The masked threshold is used in a data compression unit, such as the data compression units 12.1 and 12.2, to realize the data compression. From prior art documents it can be understood that bit allocation information can be derived from the masked threshold supplied to a data compression unit, The bit allocation information is an indication by how many bits per sample, the samples in a subband or transform signal are quantized. It will be clear that this bit allocation information can be transmitted as well via the transmission medium as instruction signal so as to instruct the data expansion units 32.1 and 32.2 to carry out their data expansion steps in a correct way so as to regenerate the replicas of the two information signals L' and R'.

The encoder apparatus may further comprise a user interface 21 for generating an enable control signal in response to a user actuating the user interface. The enable control signal is supplied to the selection units 16.1 and 16.2 and enables the selection units so that they carry out their functioning as described above. When disabled, the selection unit 16.1 supplies the masked threshold signal $mt_1$ to its output an the selection unit 16.2 supplies the masked threshold $mt_2$ to its output. The enable control signal is also supplied as a flag signal to the combination unit 18, for combining the flag signal into the transmission signal for transmission via the transmission medium TRM.

A correspondingly equipped decoder apparatus is capable of retrieving the flag signal from the transmission medium. When present in the transmission signal, the flag signal is an indication that the encoding took place in the way as described above, including the selection of the masked thresholds. The decoder now knows that it can generate the combination signal M, without the risk of artifacts in the signal M. When the flag is absent, this is an indication that no selection of masked thresholds took place upon encoding. The decoding apparatus may issue a warning signal, indicating that, if the combination signal is to be generated, such combination signal may be affected with artifacts.

Figure 3:
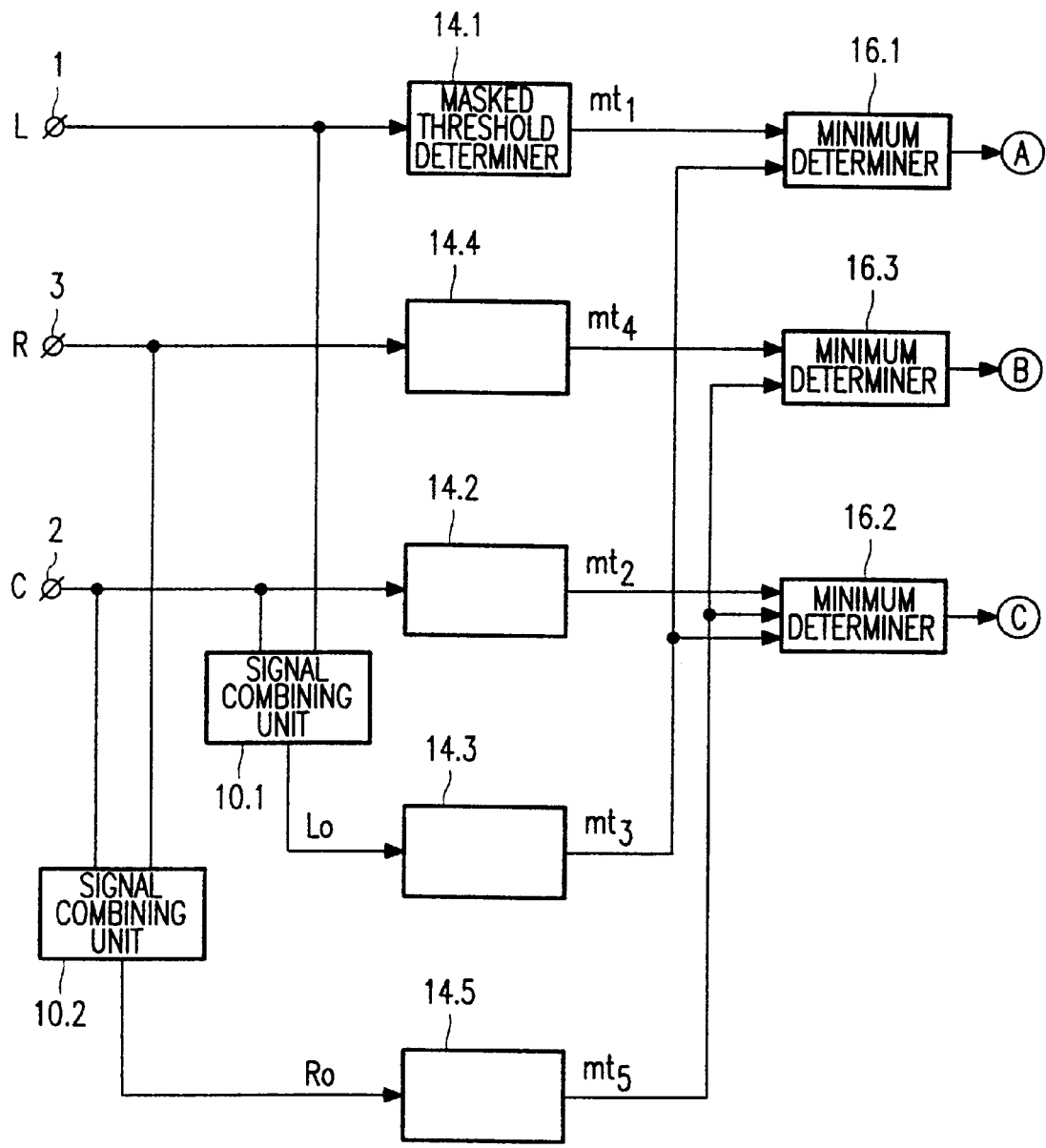
Figure 4:
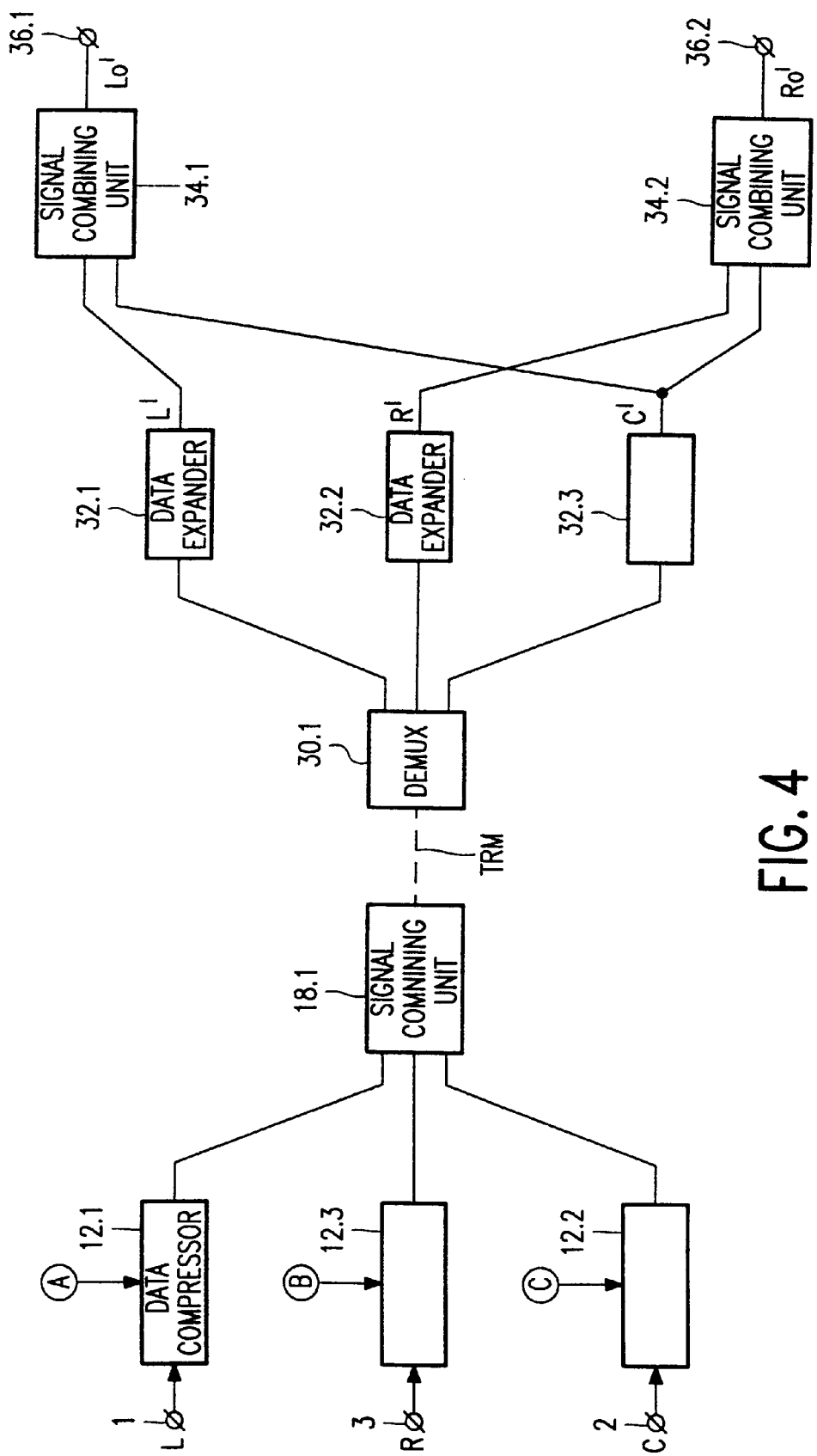

FIG. 3 shows part of a second embodiment of the encoder apparatus, where FIG. 4 shows another part of the encoder apparatus and a corresponding decoder apparatus for decoding the encoded information signals. The encoder has a first input terminal 1 for receiving a first digital information signal, such as the left signal component L of a three channel digital audio signal, a second input terminal 2 for receiving a second digital information signal, such as the centre signal component of the three channel audio signal, and a third input terminal 3 for receiving a third digital information signal, such as the right signal component R of the three channel audio signal. The input terminal 1 is coupled to inputs of a first data compressor unit 12.1 and a first masked threshold determining unit 14.1 and to an input of a first signal combination unit 10.1. The input terminal 2 is coupled to inputs of a second data compressor unit 12.2 and a second masked threshold determining unit 14.2, to another input of the first signal combining unit 10.1 and to an input of a second signal combination unit 10.2. The input terminal 3 is coupled to inputs of a third data compressor unit 12.3 and a masked threshold determining unit 14.4 and to another input of the second signal combining unit 10.2. An output of the signal combining unit 10.1 is coupled to a third masked threshold determining unit 14.3 and an output of the signal combining unit 10.2 is coupled to a fifth masked threshold determining unit 14.5

Outputs of the data compressor units 12.1, 12.2 and 12.3 are coupled to corresponding inputs of a signal combining unit 18.1. The encoder apparatus is further provided with selection units 16.1, 16.2 and 16.3. The selection unit 16.1 has inputs coupled to the outputs of the masked threshold determining units 14.1 and 14.3, the selection unit 16.2 has inputs coupled to the outputs of the masked threshold determining units 14.2, 14.3 and 14.5 and the selection unit 16.3 has inputs coupled to the outputs of the masked threshold determining units 14.4 and 14.5.

The encoder apparatus functions as follows. In the present embodiment, the signal combination unit 10.1 combines the signals L and C in order to obtain a first combination signal $L_0$, that satisfies the following equation:

$$L_0 = L + C. \qquad (Eq.4a)$$

Further, the signal combination unit 10.2 combines the signals R and C in order to obtain a second combination signal $R_0$, that satisfies the following equation:

$$R_0 = R + C. \qquad (Eq.4b)$$

The masked threshold determining units 14.1, 14.2, 14.3, 14.4 and 14.5 generate a masked threshold $mt_1$, $mt_2$, $mt_4$, $mt_3$ and $mt_5$ respectively, from the signals L, C, $L_0$, R and $R_0$ respectively, applied to their respective inputs. The masked thresholds are required to enable a data compression step to be carried out on the three information signals in the data compression units 12.1, 12.2 and 12.3. The generation of a masked threshold from an information signal is well known in the art as explained above.

In accordance with the prior art, the masked threshold derived from the first digital information signal L, that is the masked threshold $mt_1$ derived in the masked threshold determining unit 14.1, is used for data compressing this first digital information signal L. In a similar way, the masked threshold derived from the second digital information signal C, that is the masked threshold $mt_2$ derived in the masked threshold determining unit 14.2, is used for data compressing this second digital information signal. Further, the masked threshold derived from the third digital information signal R, that is the masked threshold $mt_4$ derived in the masked threshold determining unit 14.4, is used for data compressing this second digital information signal R.

In accordance with the present invention, however, a selection is made between masked thresholds in the selection units 16.1, 16.2 and 16.3. More specifically, the selection unit 16.1 selects between the masked thresholds $mt_1$ and $mt_3$, the selection unit 16.2 selects between the masked thresholds $mt_2$, $mt_3$ and $mt_5$ and the selection unit 16.3 selects between the masked thresholds $mt_4$ and $mt_5$, for the reason explained hereafter.

FIG. 4 shows not only a portion of the encoder apparatus, but also a corresponding decoder apparatus. The decoder apparatus comprises a demultiplexer unit 30.1 for receiving the transmission signal transmitted via the transmission medium TRM. The demultiplexer unit 30.1 retrieves the data compressed first, second and third digital signals from the transmission signal and supplies the data compressed digital signals to respective data expander units 32.1, 32.2 and 32.3. In the data expander units 32.1, 32.2 and 32.3, the data compressed digital information signals are expanded so as to obtain replicas L', R' and C' respectively, of the original digital information signals L, R and C, respectively. The decoder apparatus further comprises a signal combination unit 34.1 for combining the replicas L' and C' so as to obtain a combination signal $L_0'$, in accordance with $$L_0' = L' + C'. \qquad (Eq.5)$$

Let us assume for the moment that the signals L and C have been data compressed on the basis of $mt_1$, and $mt_2$ respectively. Actually, however, the following relationship exists:

$$L_0' = L + N_L + C + N_C, \qquad (Eq.6)$$

where $N_L$ is the quantisation noise introduced by data compressing the signal L using the masked threshold $mt_1$ and $N_C$ is the quantisation noise introduced by data compressing the signal C using the masked threshold $mt_2$. Generally, the noise component $N_L$ is masked by the signal L and the noise component $N_C$ is masked by the signal C, so that the quantisation noise is inaudible. Suppose however that L and C are roughly of the same amplitude, but of opposite phase. As a result of this, the signal component L+C is small and the noise components $N_L + N_C$ may become audible.

In order to overcome this, the selection unit 16.1 determines which of the masked thresholds $mt_1$, and $mt_3$ supplied to its inputs is the smallest and supplies the smallest masked threshold to the data compression unit 12.1. Further, the selection unit 16.3 determines which of the masked thresholds $mt_4$ and $mt_5$ supplied to its inputs is the smallest and supplies the smallest masked threshold to the data compression unit 12.3 for data compressing R.

The selection unit 16.2 determines which of the masked thresholds $mt_2$, $mt_3$ and $mt_5$ supplied to its inputs is the smallest and supplies the smallest masked threshold to the data compression unit 12.2 for data compressing C, for the following reasoning. The signal C appears in both equations (4a) and (4b). The minimum of the masked thresholds of $L_0$ and C should be used according to eq. (4a), whilst eq. (4b) requires that the smallest of the masked thresholds of $R_0$ and C should be used. Consequently, the smallest of the masked thresholds of $L_0$, $R_0$ and C should be used for compressing C.

The masked threshold is used in a data compression unit, such as the data compression units 12.1, 12.2 and 12.3, to realize the data compression. As has been argued above, bitallocation information can be derived from the masked threshold supplied to a data compression unit. The bitallocation information is an indication by how many bits per sample, the samples in a subband signal are quantized. It will be clear that this bitallocation information can be transmitted as well via the transmission medium as instruction signal so as to instruct the data expansion units 32.1, 32.2 and 32.3 to carry out their data expansion steps in a correct way so as to regenerate the replicas of the information signals L', C' and R'.

In a further elaborated version of the encoder apparatus of FIG. 3 and 4, the signal combination unit 10.1 combines the signals L and C in order to obtain a first combination signal $L_0$, that satisfies the following equation:

$$L_0 = L + a.C. \tag{Eq.7a}$$

Further, the signal combination unit 10.2 combines the signals R and C in order to obtain a second combination signal $R_0$, that satisfies the following equation:

$$R_0 = R \pm a.C, \tag{Eq.7b}$$

where a may be negative.

In this version of the encoder apparatus, the masked threshold determining unit 14.2 is adapted to generate a masked threshold $mt_2'$ which is the masked threshold for the signal a.C. One could obtain the masked threshold $mt_2'$ in another way, namely by multiplying $mt_2$ (which is considered to be the masked threshold of the signal C) by $|a|$, where flag $|a|$ is the absolute value of a. The masked threshold $mt_2'$ is supplied by the determining unit 14.2 to the selection unit 16.2 and the selection unit 16.2 compares the masked thresholds $mt_2'$, $mt_3$ and $mt_5$ with each other.

Selection is realized in the following manner. Suppose that $mt_2'$ is the smallest masked threshold of the masked thresholds supplied to the selection unit 16.2. In that situation, the masked threshold $mt_2$ is used for data compressing C. If $mt_3$ is the smallest masked threshold, the masking effect of the signal $L_0$ is used for data compressing C in the following way: the masked threshold of the signal $L_0$ divided by $|a|$ is determined and used for data compressing C. Alternatively, $mt_3$ divided by $|a|$ is used as the masked threshold for data compressing C.

If $mt_5$ is the smallest masked threshold, the masking effect of the signal $R_0$ is used for data compressing C in the following way: the masked threshold of the signal $R_0$ divided by $|a|$ is determined and used for data compressing C. Alternatively, $mt_5$ divided by $|a|$ is used as the masked threshold for data compressing C.

The selection units 16.1 to 16.3 may further be adapted to subtract a predetermined number of dB, in the case that two of them select the same masked threshold, as described above with reference to the embodiment of the FIGS. 1 and 2.

The encoder apparatus of the FIGS. 3 and 4 may further be provided with the user interface 21 (not shown in the FIGS. 3 and 4) described in FIG. 1 for generating the enable control signal and may be adapted to transmit the flag signal so as to indicate that the signal transmitted was encoded in the way in accordance with the invention (including the selection of the masked thresholds), which means that the flag is present in the transmitted signal, or so as to indicate that no such selection took place (flag absent).

Figure 5:
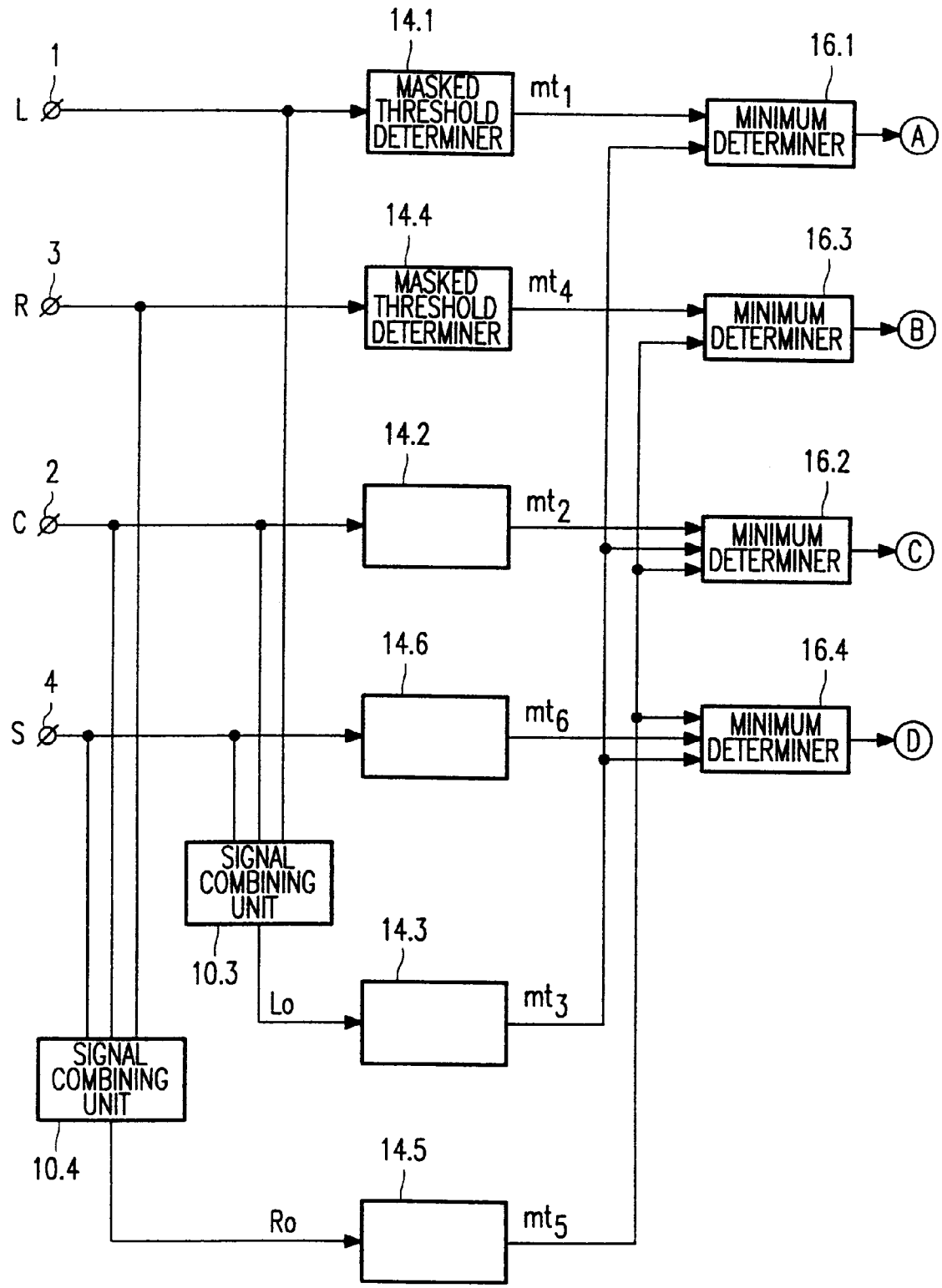
Figure 6:
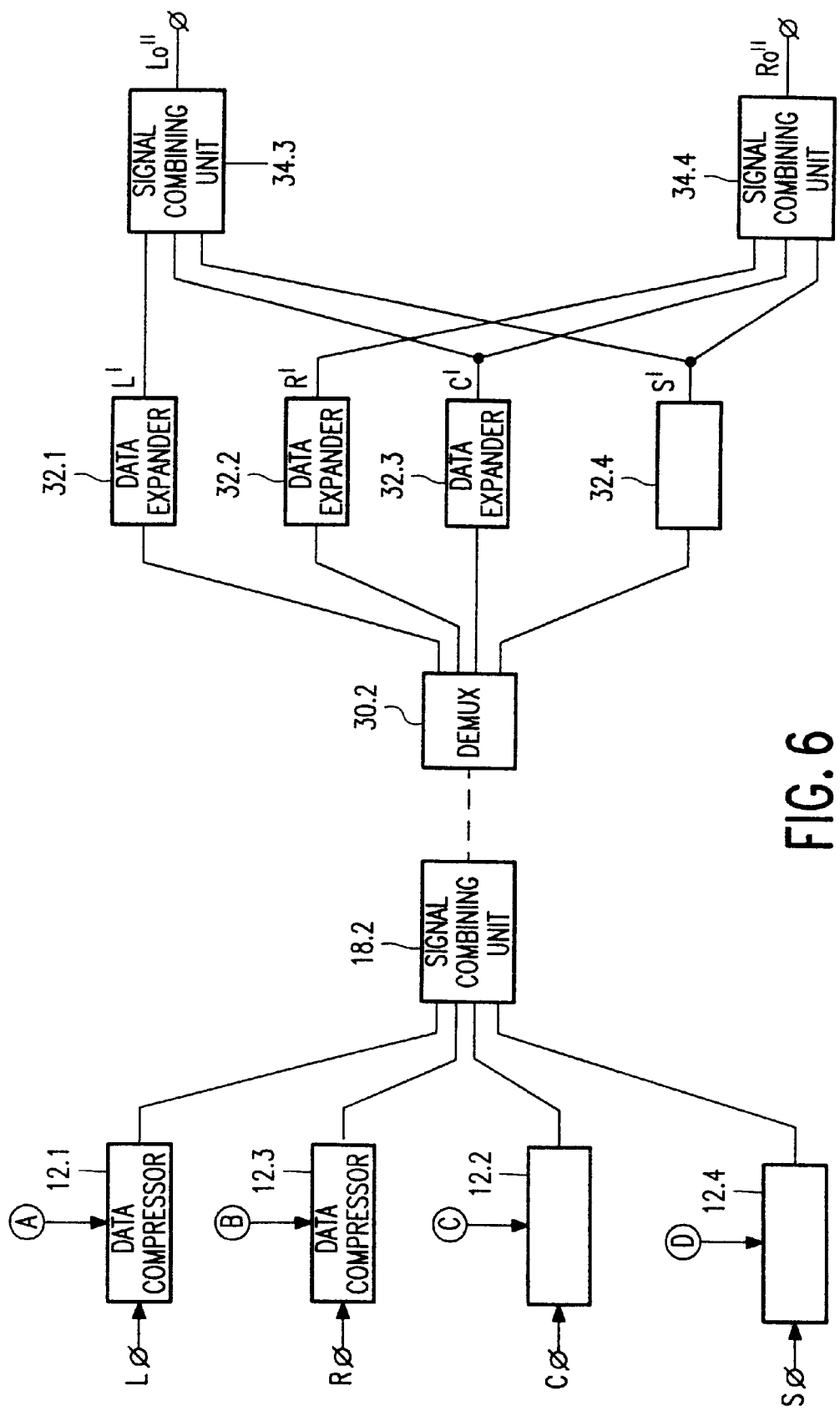

FIG. 5 shows part of a third embodiment of the encoder apparatus, where FIG. 6 shows another part of the encoder apparatus of FIG. 5 and further shows a corresponding decoder apparatus for decoding the encoded information first signals. The encoder of the FIGS. 5 and 6 shows a large resemblance with the encoder apparatus of the FIGS. 3 and 4. Compared with the encoder apparatus of the FIGS. 3 and 4, the encoder apparatus of the FIGS. 5 and 6 further comprise a fourth input 4 for receiving a fourth digital information signal S, which is the surround signal component of a four channel surround audio signal.

The input terminal 4 is coupled to inputs of a fourth data compressor unit 12.4 and a sixth masked threshold determining unit 14.6. The input terminal 4 is also coupled to additional inputs of the first and second signal combination units 10.3 and 10.4 respectively. An output of the masked threshold determining unit 14.6 is coupled an input of a fourth selection unit 16.4. The selection unit 16.4 has two further inputs coupled to the outputs of the masked threshold determining units 14.3 and 14.4. Further, the output of the data compression unit 12.4 is coupled to a further input of the signal combining unit 18.2.

The encoder apparatus functions as follows. In the present embodiment, the signal combination unit 10.3 combines the signals L, C and S in order to obtain a first combination signal $L_0$, that satisfies the following equation:

$$L_0 = L + C + S. \tag{Eq.8a}$$

Further, the signal combination unit 10.4 combines the signals R, C and S in order to obtain a second combination signal $R_0$, that satisfies the following equation:

$$R_0 = R + C + S. \tag{Eq.8b}$$

The masked threshold determining units 14.1, 14.2, 14.3, 14.4 and 14.5 again generate a masked threshold $mt_1$, $mt_2$, $mt_3$, $mt_4$ and $mt_5$ respectively, from the signals L, C, $L_0$, R and $R_0$ respectively, applied to their respective inputs. Further, the unit 14.6 generates a masked threshold $mt_6$ from the signal S applied to its input.

The selection of the masked thresholds in the selection units 16.1, 16.2 and 16.3 is the same as explained above in the description with reference to the FIGS. 3 and 4. The selection of the masked threshold in the selection unit 16.4 is such that it selects the smallest one of the masked thresholds $mt_3$, $mt_5$ and $mt_6$ applied by the determining units 14.3, 14.5 and 14.6 respectively.

FIG. 6 shows not only a portion of the encoder apparatus of FIG. 5, but also a corresponding decoder apparatus. The decoder apparatus shows large resemblances with the decoder apparatus of FIG. 4. The demultiplexer unit 30.2 also retrieves the data compressed fourth digital signals from the transmission signal and supplies the data compressed digital signal to a corresponding data expander unit 32.4. In the data expander unit 32.4, the fourth data compressed digital information signal is expanded so as to obtain a replica S' of the fourth digital information signal S. The signal combination unit 34.3 combines the replicas L', C' and S' so as to obtain a combination signal $L_0''$, in accordance with $$L_0'' = L' + C' + S'. \tag{Eq.9a}$$

The signal combination unit 34.4 combines the replicas R', C' and S' so as to obtain a combination signal $R_0''$ in accordance with $$R_0'' = R' + C' + S'. \tag{Eq.9b}$$

Where necessary, bitallocation information derived from the masked thresholds selected can be supplied to the signal combining unit 18.2 and transmitted.

In a further elaborated version of the encoder apparatus of FIGS. 5 and 6, the signal combination unit 10.3 combines the signals L, C and S in order to obtain a first combination signal $L_0$, that satisfies the following equation:

$$L_0 = L + a.C + b.S. \tag{Eq.10a}$$

Further, the signal combination unit 10.4 combines the signals R, C and S in order to obtain a second combination signal $R_0$, that satisfies the following equation:

$$R_0 = R + a.C \pm b.S. \tag{Eq.10b}$$

a and b are positive or negative integers.

In this version of the encoder apparatus, the masked threshold determining units 14.2 and 14.6 function differently. The determining unit 14.2 generates a masked threshold $mt_2'$. The masked threshold $mt_2'$ is the masked threshold for the signal a.C. One could obtain the masked threshold $mt_2'$ in another way, namely by multiplying $mt_2$ (which is the masked threshold of the signal C) by $|a|$ where $|a|$ is the absolute value of a. The selection unit 16.2 now compares the masked thresholds $mt_2'$, $mt_3$ and $mt_5$ with each other and generates a selected masked threshold in the following way.

Suppose that $mt_2'$ is the smallest masked threshold. In that situation, the masked threshold $mt_2$ is used for data compressing C. If $mt_3$ is the smallest masked threshold, the masking effect of the signal $L_0$ is used for data compressing C in the following way: the masked threshold of the signal $L_0$ divided by $|a|$ is determined and used for data compressing C. Alternatively, $mt_3$ divided by $|a|$ is used as the masked threshold for data compressing C.

If $mt_5$ is the smallest masked threshold, the masking effect of the signal $R_0$ is used for data compressing C in the following way: the masked threshold of the signal $R_0$ divided by $|a|$ is determined and used for data compressing C. Alternatively, $mt_5$ divided by $|a|$ is used as the masked threshold for data compressing C.

The determining unit 14.6 generates a masked threshold $mt_6'$. The masked threshold $mt_6'$ is the masked threshold for the signal b.S. One could obtain the masked threshold $mt_6'$ in another way, namely by multiplying $mt_6$ by $|b|$. The selection unit 16.4 now compares the masked thresholds $mt_6'$, $mt_4$ and $mt_5$ with each other.

Selection is realized in the following manner. Suppose that $mt_6'$ is the smallest masked threshold. In that situation, the masked threshold $mt_6$ is used for data compressing S. If $mt_3$ is the smallest masked threshold, the masking effect of the signal $L_0$ is used for data compressing S in the following way: the masked threshold of the signal $L_0/|b|$ is determined and used for data compressing S. Alternatively, $mt_3/|b|$ is used as the masked threshold for data compressing S.

If $mt_5$ is the smallest masked threshold, the masking effect of the signal $R_0$ is used for data compressing S in the following way: the masked threshold of the signal $R_0/|b|$ is determined and used for data compressing S. Alternatively, $mt_5/|b|$ is used as the masked threshold for data compressing S.

The selection units 16.1 to 16.4 may further be adapted to subtract a predetermined number of dB, in the case that two of them select the same masked threshold, as described above with reference to the embodiment of the FIGS. 1 and 2. Further, if three of them select the same masked threshold, the selection units may be adapted to subtract an even larger number of dB from the masked threshold selected. More specifically, roughly 5 dB (=10log3) is subtracted.

The encoder apparatus of the FIGS. 5 and 6 may further be provided with the user interface 21 (not shown in the FIGS. 5 and 6) described in FIG. 1 for generating the enable control signal and may be adapted to transmit the flag signal so as to indicate that the signal transmitted was encoded in the way in accordance with the invention (including the selection of the masked thresholds), which means that the flag is present in the transmitted signal, or so as to indicate that no such selection took place (flag absent).

Figure 7:
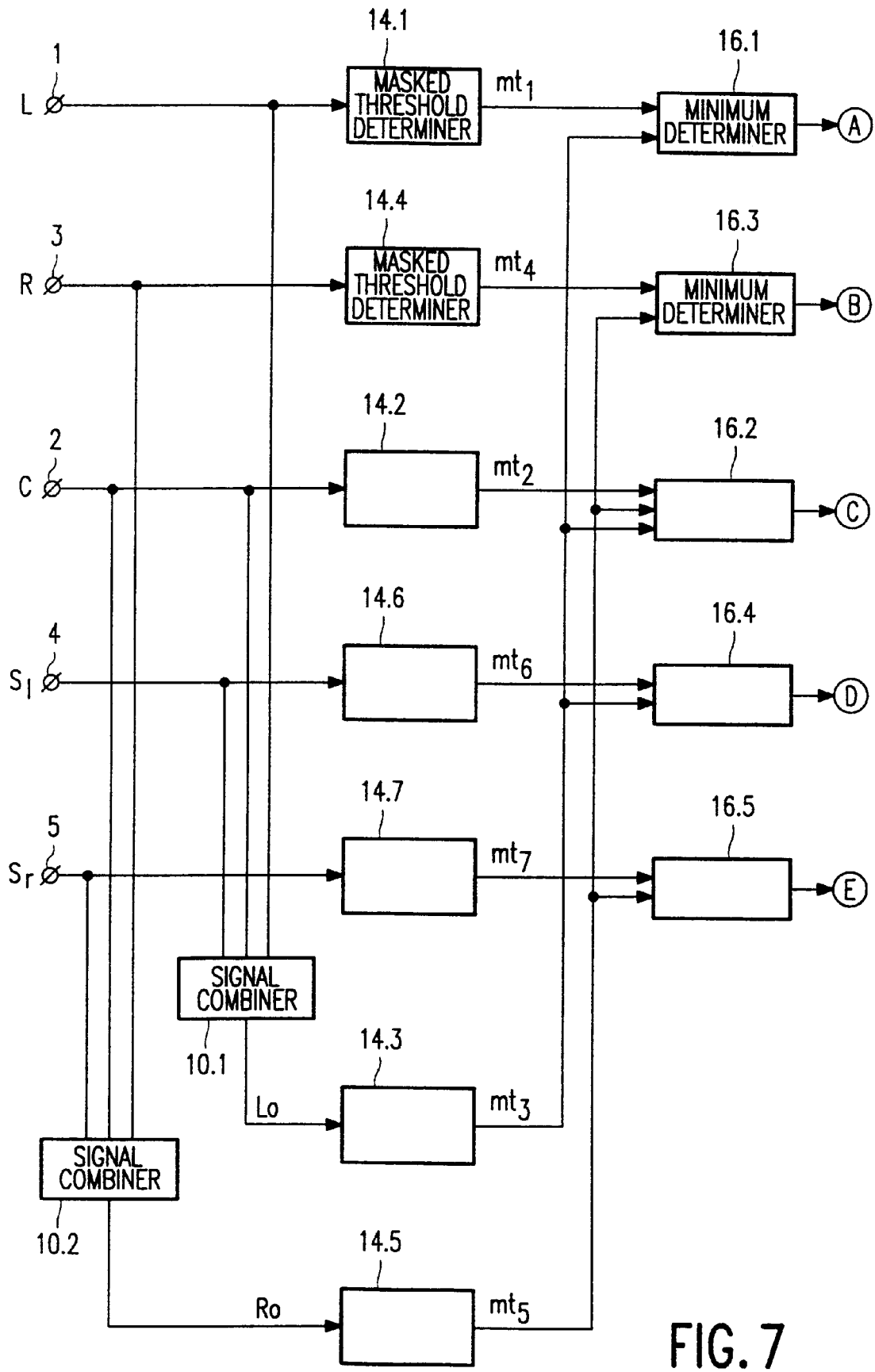
Figure 8:
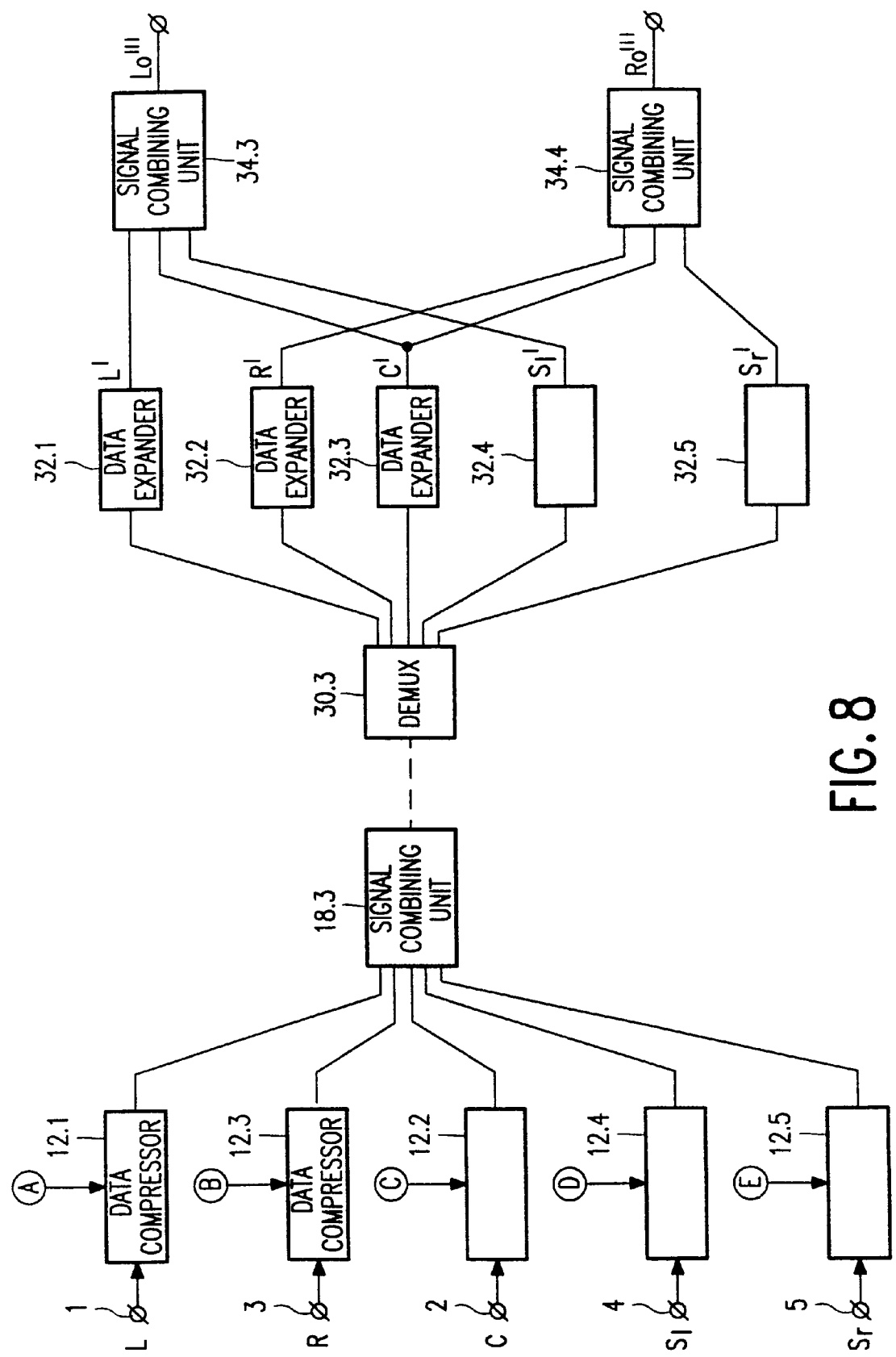

FIG. 7 shows part of a fourth embodiment of the encoder apparatus, where FIG. 8 shows another part of the encoder apparatus of FIG. 7 and further shows a corresponding decoder apparatus for decoding the encoded information signals. The encoder of the FIGS. 7 and 8 shows a large resemblance with the encoder apparatus of the FIGS. 3 and 4. Compared with the encoder apparatus of the FIGS. 3 and 4, the encoder apparatus of the FIGS. 7 and 8 further comprise a fourth input 4 for receiving a fourth digital information signal $S_l$, which is the left surround signal component of a five channel surround audio signal and a fifth input 5 for receiving a fifth digital information signal $S_r$, which is the right surround signal component of a five channel surround audio signal.

The input terminal 4 is coupled to inputs of a fourth data compressor unit 12.4 and a sixth masked threshold determining unit 14.6. The input terminal 4 is also coupled to an additional input of the first signal combination unit 10.1. An output of the masked threshold determining unit 14.6 is coupled an input of a fourth selection unit 16.4. The selection unit 16.4 has one further input coupled to the output of the masked threshold determining unit 14.3. Further, the output of the data compression unit 12.4 is coupled to a further input of the signal combining unit 18.3.

The input terminal 5 is coupled to inputs of a fifth data compressor unit 12.5 and a seventh masked threshold determining unit 14.7. The input terminal 5 is also coupled to an additional input of the second signal combination unit 10.2. An output of the masked threshold determining unit 14.7 is coupled an input of a fifth selection unit 16.5. The selection unit 16.5 has one further input coupled to the output of the masked threshold determining unit 14.5. Further, the output of the data compression unit 12.5 is coupled to a further input of the signal combining unit 18.3.

The encoder apparatus functions as follows. In the present embodiment, the signal combination unit 10.1 combines the signals L, C and $S_l$ in order to obtain a first combination signal $L_0$, that satisfies the following equation:

$$L_0 = L + C + S_l. \tag{Eq.11a}$$

Further, the signal combination unit 10.2 combines the signals R, C and $S_r$ in order to obtain a second combination signal $R_0$, that satisfies the following equation:

$$R_0 = R + C + S_r. \tag{Eq.11b}$$

The masked threshold determining units 14.1, 14.2, 14.3, 14.4 and 14.5 again generate a masked threshold $mt_1$, $mt_2$, $mt_3$, $mt_4$ and $mt_5$ respectively, from the signals L, C, $L_0$, R and $R_0$ respectively, applied to their respective inputs. Further, the units 14.6 and 14.7 generate masked thresholds $mt_6$ and $mt_7$ respectively from the signals $S_l$ and $S_r$ respectively, applied to their inputs.

The selection of the masked thresholds in the selection units 16.1, 16.2 and 16.3 is the same as explained above in the description with reference to the FIGS. 3 and 4. The selection of the masked threshold in the selection unit 16.4 is such that it selects the smallest one of the masked thresholds $mt_3$ and $mt_6$ applied by the determining units 14.3 and 14.6 respectively. The selection of the masked threshold in the selection unit 16.5 is such that it selects the smallest one of the masked thresholds $mt_5$ and $mt_7$ applied by the determining units 14.5 and 14.7 respectively.

FIG. 8 shows not only a portion of the encoder apparatus of FIG. 7, but also a corresponding decoder apparatus. The decoder apparatus shows large resemblances with the decoder apparatus of FIG. 4. The demultiplexer unit 30.3 also retrieves the data compressed fourth and fifth digital signals from the transmission signal and supplies the data compressed digital signals to corresponding data expander units 32.4 and 32.5. In the data expander unit 32.4, the fourth data compressed digital information signal is expanded so as to obtain a replica $S_l'$ of the fourth digital information signal $S_l$. The signal combination unit 34.3 combines the replicas L', C' and $S_l'$ so as to obtain a combination signal $L_0'''$, in accordance with $$L_0'''=L'+C'+S_l'. \quad \text{(Eq.12a)}$$

In the data expander unit 32.5, the fifth data compressed digital information signal is expanded so as to obtain a replica $S_r'$ of the fifth digital information signal $S_r$. The signal combination unit 34.4 combines the replicas R', C' and $S_r'$ so as to obtain a combination signal $R_0'''$ in accordance with $$R_0'''=R'+C'+S_r'. \quad \text{(Eq.12b)}$$

Where necessary, bitallocation information derived from the masked thresholds selected can be supplied to the signal combining unit 18.3 and transmitted.

In a further elaborated version of the encoder apparatus of FIGS. 7 and 8, the signal combination unit 10.1 combines the signals L, C and $S_l$ in order to obtain a first combination signal $L_0$, that satisfies the following equation:

$$L_0=L+a.C+b.S_l. \quad \text{(Eq.13a)}$$

Further, the signal combination unit 10.2 combines the signals R, C and $S_r$ in order to obtain a second combination signal $R_0$, that satisfies the following equation:

$$R_0=R+a.C+d.S_r. \quad \text{(Eq.13b)}$$

In this version of the encoder apparatus, the masked threshold determining unit 14.2 and the selection unit 16.2 function in the way already described above with reference to the FIGS. 3, 4, 5 and 6.

A further explanation of the selection in the selection units 16.4 and 16.5 will now be given.

The determining unit 14.6 generates a masked threshold $mt_6'$. The masked threshold $mt_6'$ is the masked threshold for the signal $b.S_l$. One could obtain the masked threshold $mt_6'$ in another way, namely by multiplying $mt_6$ by $|b|$. The selection unit 16.4 now compares the masked thresholds $mt_6'$ and $mt_3$ with each other.

Selection is realized in the following manner. Suppose that $mt_6'$ is the smallest masked threshold. In that situation, the masked threshold $mt_6$ is used for data compressing $S_l$. If $mt_3$ is the smallest masked threshold, the masking effect of the signal $L_0$ is used for data compressing $S_l$ in the following way: the masked threshold of the signal $L_0/|b|$ is determined and used for data compressing $S_l$. Alternatively, $mt_3/|b|$ is used as the masked threshold for data compressing $S_l$.

The determining unit 14.7 generates a masked threshold $mt_7'$. The masked threshold $mt_7'$ is the masked threshold for the signal $d.S_r$. One could obtain the masked threshold $mt_7'$ in another way, namely by multiplying $mt_7$ by $|d|$. The selection unit 16.5 now compares the masked thresholds $mt_7'$ and $mt_5$ with each other.

Selection is realized in the following manner. Suppose that $mt_7'$ is the smallest masked threshold. In that situation, the masked threshold $mt_7$ is used for data compressing $S_r$. If $mt_5$ is the smallest masked threshold, the masking effect of the signal $R_0$ is used for data compressing $S_r$ in the following way: the masked threshold of the signal $R_0/|d|$ is determined and used for data compressing $S_r$. Alternatively $mt_5/|d|$ is used as the masked threshold for data compressing $S_r$.

The selection units 16.1 to 16.5 may further be adapted to subtract a predetermined number of dB, in the case that two of them select the same masked threshold, as described above with reference to the embodiment of the FIGS. 1 and 2. Further, if three of them select the same masked threshold, the selection units may be adapted to subtract an even larger number of dB from the masked threshold selected. More specifically, roughly 5 dB (=10log3) is subtracted.

The encoder apparatus of the FIGS. 7 and 8 may further be provided with the user interface 21 (not shown in the FIGS. 7 and 8) described in FIG. 1 for generating the enable control signal and may be adapted to transmit the flag signal so as to indicate that the signal transmitted was encoded in the way in accordance with the invention (including the selection of the masked thresholds), which means that the flag is present in the transmitted signal, or so as to indicate that no such selection took place (flag absent).

Figure 9:
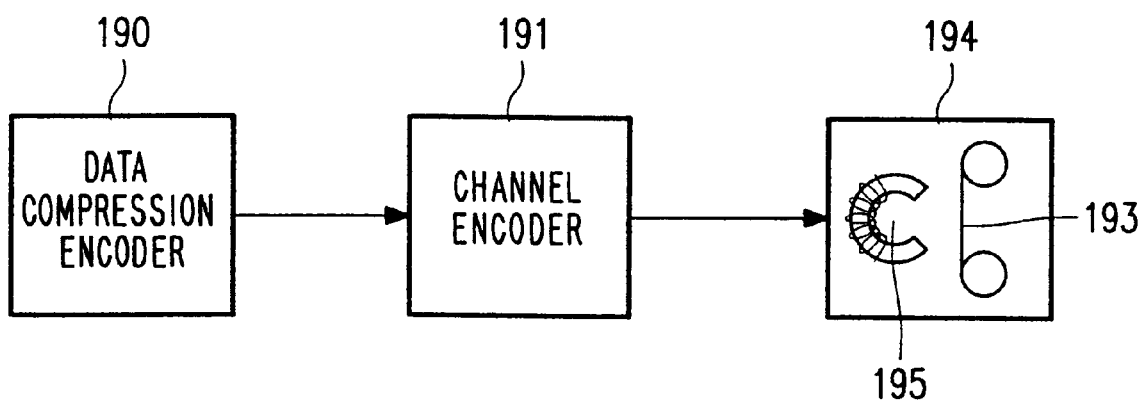

The encoder apparatus can be used in an arrangement for storing the signal supplied by the encoder apparatus on a storage medium, such as a record carrier. FIG. 9 schematically shows such a storage arrangement in the form of a recording arrangement. The block denoted by 190 is the encoder apparatus described above. The block denoted by 191 can be a channel encoder, if the channel encoder is not incorporated in the combining unit 18, 18.1, 18.2 or 18.3. In the channel encoder, the signal applied to its input 192 is encoded in, as an example a Reed-Solomon encoder, and an interleaver, so as to enable an error correction to be carried out in the receiver. Further, again as an example, an 8-to-10 modulation well known in the art, see document (5) in the list of references, is carried out. The signal thus obtained is recorded in one track or a multiplicity of tracks on a record carrier 193, such as a magnetic or optical record carrier, by means of writing means 194, such as a magnetic or optical head 195. The storage medium may alternatively be a solid state memory.

Whilst the present invention has been described with respect to preferred embodiments thereof, it is to be understood that these are not limitative examples. Thus, various modifications may become apparent to those skilled in the art, without departing from the scope of the invention, as defined by the claims.

More specifically, the encoder apparatus encodes the multi channel signals without matrixing. As a result, unmatrixed encoded information signals will be received in the decoder apparatus. This decoder apparatus must be capable of carrying out a matrixing procedure so as to obtain at least the two composite information signals that can be reproduced as a stereo signal via two loudspeakers positioned in a stereo setup. During decoding a noise component may become audible. Investigations resulted in the recognition that those noise components became apparent because of the matrixing process. More specifically, the noise components originated from quantisation noise that could not be masked any more. By selecting another masked threshold, this problem could be solved. More specifically, during encoding an information signal, a choice is made for the masked threshold with which the information signal in question must be data reduced. The choice is made between at least two masked thresholds, one of which is the masked threshold derived from the information signal itself and one is the masked threshold derived from another signal. This may be the masked threshold derived from that combination signal that includes the information signal in question.

Further, the invention lies in each and every novel feature or combination of features as herein disclosed.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

I claim:

1. Apparatus for encoding a plurality of digital information signals, comprising:

first input means for receiving a first digital information signal, second input means for receiving a second digital information signal, first signal combination means for combining at least the first and second digital information signal and generating a first combination signal, first and second data compression means for data compressing the first and second digital information signal respectively so as to obtain respective first and second data reduced digital information signals, first, second and third masked threshold determining means for determining first, second and third masked thresholds respectively from the first, second digital information signals and the first combination signal respectively, first selection means for selecting one masked threshold from at least the first and third masked threshold so as to obtain a first selected masked threshold, the first data compression means being adapted to carry out a data compression step on the first digital information signal depending on the first selected masked threshold, and formatting means for combining the first and second data reduced digital information signals into a transmission signal suitable for transmission via a transmission medium.

2. The apparatus of claim 1, wherein the first selected masked threshold is derived from the smallest of the masked thresholds supplied to the first selection means.

3. The apparatus of claim 1, further comprising second selection means for selecting one masked threshold from at least the second and third masked threshold so as to obtain a second selected masked threshold, the second data compression means being adapted to carry out a data compression step on the second digital information signal in response to the second selected masked threshold.

4. The apparatus of claim 3, wherein the second selected masked threshold is derived from the smallest of the masked thresholds supplied to the second selection means.

5. The apparatus of claim 1, further comprising:

third input means for receiving a third digital information signal, second signal combination means for combining at least the second and third digital information signal and being adapted to generate a second combination signal, third data compression means for data compressing the third digital information signal so as to obtain a third data reduced digital information signal, fourth and fifth masked threshold determining means for determining fourth and fifth masked thresholds respectively from the third digital information signal and the second combination signal respectively, second selection means for selecting one masked threshold from at least the second, third and fifth masked thresholds so as to obtain a second selected masked threshold, the second data compression means being adapted to carry out a data compression step on the second digital information signal in response to the second selected masked threshold, third selection means for selecting one masked threshold from at least the fourth and fifth masked threshold so as to obtain a third selected masked threshold, the third data compression means being adapted to carry out a data compression step on the third digital information signal in response to the third selected masked threshold, the formatting means being further adapted to combine the third data reduced digital information signal into the transmission signal suitable for transmission via the transmission medium.

6. The apparatus of claim 5, wherein the second selected masked threshold is the smallest of the masked thresholds supplied to the second selection means, and the third selected masked threshold is the smallest of the masked thresholds supplied to the third selection means.

7. The apparatus of claim 5, further comprising:

fourth input means for receiving a fourth digital information signal, the first signal combination means being adapted to combine the first, second and fourth digital information signal so as to generate the first combination signal, the second signal combination means being adapted to combine the second, third and fourth digital information signal so as to generate the second combination signal, fourth data compression means for data compressing the fourth digital information signal so as to obtain a fourth data reduced digital information signal, sixth masked threshold determining means for determining a sixth masked threshold from the fourth digital information signal, fourth selection means for selecting one masked threshold from the third, fifth and sixth masked thresholds so as to obtain a fourth selected masked threshold, the fourth data compression means being adapted to carry out a data compression step on the fourth digital information signal in response to the fourth selected masked threshold, the formatting means being further adapted to combine the fourth data reduced digital information signal into the transmission signal suitable for transmission via the transmission medium.

8. The apparatus of claim 7, wherein the fourth selected masked threshold is the smallest of the masked thresholds supplied to the fourth selection means.

9. The apparatus of claim 5, further comprising:

fourth input means for receiving a fourth digital information signal, fifth input means for receiving a fifth digital information signal, the first signal combination means being adapted to combine the first, second and fourth digital information signal so as to generate the first combination signal, the second signal combination means being adapted to combine the second, third and fifth digital information signal so as to generate the second combination signal, fourth data compression means for data compressing the fourth digital information signal so as to obtain a fourth data compressed digital information signal, fifth data compression means for data compressing the fifth digital information signal so as to obtain a fifth data compressed digital information signal, sixth masked threshold determining means for determining a sixth masked threshold from the fourth digital information signal, seventh masked threshold determining means for determining a seventh masked threshold from the fifth digital information signal, fourth selection means for selecting one masked threshold from the third and sixth masked thresholds so as to obtain a fourth selected masked threshold, the fourth data compression means being adapted to carry out a data compression step on the fourth digital information signal in response to the fourth selected masked threshold, fifth selection means for selecting one masked threshold from the fifth and seventh masked thresholds so as to obtain a fifth selected masked threshold, the fifth data compression means being adapted to carry out a data compression step on the fifth digital information signal in response to the fifth selected masked threshold, the formatting means being further adapted to combine the fourth and fifth data reduced digital information signals into the transmission signal suitable for transmission via the transmission medium.

10. The apparatus of claim 9, wherein the fourth selected masked threshold is the smallest of the masked thresholds supplied to the fourth selection means, and the fifth selected masked threshold is the smallest of the masked thresholds supplied to the fifth selection means.

11. The apparatus of claim 1, wherein the formatting means is further adapted to combine an instruction signal having a relationship with the first selected masked threshold into the transmission signal.

12. The apparatus as claimed claim 1, comprising user controlled means for enabling and disabling the first selection means, the apparatus further comprising a flag signal generator means for generating a flag signal in response to an enabling of the first selection means by the user, the formatting means being further adapted to combine the flag signal into the transmission signal for transmission via the transmission medium.

13. The apparatus of claim 1, wherein the signal combination means is adapted to multiply the first digital information signal received via the first input means with a first multiplication value, to multiply the second digital information signal received via the second input means with a second multiplication value and to add the multiplied versions of the first and second digital information signals.

14. The aparatus of claim 5, wherein the first signal combination means are adapted to multiply the second digital information signal with a first constant and to add the multiplied second digital information signal to the first digital information signal so as to obtain the first combination signal, the second signal combination means are adapted to multiply the second digital information signal with a second constant and to add or subtract the multiplied second digital information signal to/from the third digital information signal so as to obtain the second combination signal, the second selection means being further adapted to select a masked threshold corresponding to the masked threshold of the first combination signal, divided by the absolute value of the first constant, if the third masked threshold is smaller than the fifth masked threshold and also smaller than the second masked threshold.

15. The apparatus of claim 3, wherein, if both of the selection means have selected the same masked threshold as the selected masked threshold, then both selection means are further adapted to subtract a certain number of decibels from the selected masked threshold and supply the masked threshold thus obtained as the selected masked threshold.

16. Apparatus for encoding a plurality of n digital information signals, comprising:

n input means for receiving the n digital information signals respectively, at least one signal combination means for combining at least two of the n digital information signals and being adapted to generate at least a first combination signal, n data compression means for each data compressing one of the n digital information signals so as to obtain each one of n data reduced digital information signals, at least n+1 masked threshold determining means for determining at least n+1 masked thresholds respectively from the n digital information signals and the at least first combination signal, selection means for selecting n selected masked thresholds from the at least n+1 masked thresholds, the n data compression means being each adapted to carry out a data compression step on one the n digital information signals in response to one of the n selected masked thresholds respectively, and formatting means for combining the n data reduced digital information signals into a transmission signal suitable for transmission via a transmission medium, n being an integer larger than 1.

17. The apparatus of claim 16, wherein a selected masked threshold is selected from a subgroup of the at least n+1 masked thresholds such that the selected masked threshold is the smallest of the masked thresholds in the subgroup.

18. Apparatus for encoding a plurality of n digital information signals, comprising:

input means for receiving the n digital information signals, signal combination means for combining at least two of the n digital information signals and being adapted to generate at least a first combination signal, data compression means for data compressing the n digital information signals so as to obtain n data reduced digital information signals, masked threshold determining means for determining at least n+1 masked thresholds from the n digital information signals and the at least first combination signal, selection means for selecting n selected masked thresholds from the at least n+1 masked thresholds, a selected masked threshold being selected from a subgroup of at least two masked thresholds from the at least n+1 masked thresholds, the n subgroups for the selection of the n selected masked threshold being different from each other, the data compression means being each adapted to carry out a data compression step on each of the n digital information signals in response to one of the n selected masked thresholds respectively, and formatting means for combining the n data reduced digital information signals into a transmission signal suitable for transmission via a transmission medium, n being an integer larger than 1.

19. The apparatus of claim 18, wherein a selected masked threshold is selected from a subgroup of at least two masked thresholds from the at least n+1 masked thresholds such that the selected masked threshold is the smallest of the masked thresholds in the subgroup.

20. The apparatus of claim 1, further provided with writing means for writing the transmission signal into a storage medium.

21. A method of encoding a plurality of digital information signals, the method comprising the steps of:

receiving a first digital information signal, receiving a second digital information signal, combining the first and second digital information signal so as to generate a first combination signal, data compressing the first and second digital information signal so as to obtain respective first and second data reduced digital information signals, determining first, second and third masked thresholds respectively from the first, second digital information signals and the combination signal respectively, selecting one masked threshold from the first and third masked threshold so as to obtain a first selected masked threshold, the data compression step carrying out data compression on the first digital information signal in response to the first selected masked threshold, combining the first and second data reduced digital information signals into a transmission signal suitable for transmission via a transmission medium.

22. The method of claim 21, further comprising the step of writing the transmission signal into a storage medium.

23. Apparatus for encoding a plurality of n digital information signals, comprising:

n input means for receiving the n digital information signals respectively, n data compression means for each data compressing one of the n digital information signals so as to obtain each one of n data reduced digital information signals, at least n+1 masked threshold determining means for determining at least n+1 masked thresholds from the n digital information signals respectively, selection means for selecting n selected masked thresholds from the at least n+1 masked thresholds, such that at least one selected masked threshold is obtained from a selection of at least two of the at least n+1 masked thresholds, the n data compression means being each adapted to carry out a data compression step on one of the n digital information signals in response to one of the n selected masked thresholds, and formatting means for combining the n data reduced digital information signals into a transmission signal suitable for transmission via a transmission medium, n being an integer larger than 1.

24. Method of encoding a plurality of digital information signals, the method comprising the steps of receiving a first digital information signal, receiving a second digital information signal, data compressing the first and second digital information signal so as to obtain respective first and second data reduced digital information signals, determining first and second masked thresholds from the first and second digital information signals respectively, and a third masked threshold from the first and second information signals deriving from the first, second, and third masked thresholds a first selected masked threshold, the data compression step carrying out data compression on the first digital information signal in response to said first selected masked threshold, combining the first and second data reduced digital information signals into a transmission signal suitable for transmission via a transmission medium.

* * * * *